(12) United States Patent
Yamasaki et al.

(10) Patent No.: US 9,768,470 B2
(45) Date of Patent: Sep. 19, 2017

(54) METHOD FOR MANUFACTURING NONAQUEOUS ELECTROLYTE SECONDARY CELL, AND CELL ASSEMBLY

(71) Applicant: TOYOTA JIDOSHA KABUSHIKI KAISHA, Toyota-shi, Aichi (JP)

(72) Inventors: Hiroshi Yamasaki, Nagoya (JP); Tatsuya Hashimoto, Osaka (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 15/226,061

(22) Filed: Aug. 2, 2016

(65) Prior Publication Data

US 2017/0040641 A1   Feb. 9, 2017

(30) Foreign Application Priority Data

Aug. 3, 2015 (JP) ................. 2015-153691

(51) Int. Cl.
| | |
|---|---|
| *H01M 10/0568* | (2010.01) |
| *H01M 10/0525* | (2010.01) |
| *H01M 4/133* | (2010.01) |
| *H01M 4/583* | (2010.01) |
| *H01M 10/44* | (2006.01) |

(52) U.S. Cl.
CPC ....... *H01M 10/0568* (2013.01); *H01M 4/133* (2013.01); *H01M 4/583* (2013.01); *H01M 10/0525* (2013.01); *H01M 10/446* (2013.01)

(58) Field of Classification Search
CPC .. H01M 10/0568; H01M 4/133; H01M 4/583; H01M 10/0525; H01M 10/446
See application file for complete search history.

(56) References Cited

U.S. PATENT DOCUMENTS

2012/0308881 A1  12/2012 Tokuda et al.
2016/0294011 A1  10/2016 Yamasaki et al.

FOREIGN PATENT DOCUMENTS

| JP | 2008282617 A | * | 11/2008 |
| JP | 2011-187440 A1 | | 9/2011 |
| JP | 2016192383 A | | 11/2016 |

OTHER PUBLICATIONS

J-PlatPat Machine Translation of the detailed description of JP 2008-282617A (Nov. 20, 2008).*

* cited by examiner

*Primary Examiner* — Gregg Cantelmo
(74) *Attorney, Agent, or Firm* — Sughrue Mion, PLLC (57) ABSTRACT

Provided is a method for manufacturing a nonaqueous electrolyte secondary cell which can maintain and demonstrate an excellent cell characteristic over a long period of time. The method for manufacturing a nonaqueous electrolyte secondary cell provided by the present invention includes: a step of preparing a positive electrode having a positive electrode mix layer and a negative electrode having a negative electrode mix layer; and a step of housing the positive electrode and the negative electrode together with a nonaqueous electrolytic solution in a cell case. The nonaqueous electrolytic solution includes a Compound (I) constituted by lithium tris(oxalate)phosphate. When a BET specific surface area of the negative electrode mix layer is denoted by X ($m^2/g$) and the amount of the Compound (I) added to the entire amount of the nonaqueous electrolytic solution is denoted by Y (% by mass), the following relationships are satisfied: $3 \leq X \leq 4.3$; $0.4 \leq Y \leq 1.5$; and $(Y/X) \leq 0.35$.

2 Claims, 3 Drawing Sheets

METHOD FOR MANUFACTURING NONAQUEOUS ELECTROLYTE SECONDARY CELL, AND CELL ASSEMBLY

BACKGROUND OF THE INVENTION

1. Field of the Invention

The present invention relates to a method for manufacturing a nonaqueous electrolyte secondary cell and to a cell assembly before the initial charging which is for constructing the cell.

The present application claims priority to Japanese Patent Application No. 2015-153691 filed on Aug. 3, 2015, the entire contents of which are hereby incorporated by reference.

2. Description of the Related Art

In a nonaqueous electrolyte secondary cell such as a lithium ion secondary cell, part of the nonaqueous electrolytic solution is decomposed during the initial charging, and a protective coating film (Solid Electrolyte Interface film (SEI film)) including the decomposition products is formed on the surface of a negative electrode. This SEI film stabilizes the interface of the negative electrode and the nonaqueous electrolytic solution and improves cell durability (for example, cyclic characteristic). Japanese Patent Application Publication No. 2011-187440 is a prior art literature relating to such a film. For example, Japanese Patent Application Publication No. 2011-187440 indicates that by introducing a fluoro acid salt into a nonaqueous electrolytic solution, it is possible to form a SEI film including a component derived from the fluoro acid salt on the surface of a negative electrode and improve the durability of a cell.

SUMMARY OF THE INVENTION

However, the investigation conducted by the inventors has demonstrated that when such a technique is applied to cells (for example, cells for vehicles) that require high input/output density and capacity retention rate over a long period of time of 10 years or more, there is still room for improvement. Thus, the SEI film can degrade or peel off from the negative electrode surface in the continuous use of the cell, and it is difficult film to maintain the SEI film stably over a long period of time. Further, a new SEI film is formed in the zone where the SEI film has degraded. In such a case, typically, the nonaqueous electrolytic solution is consumed, whereby the cell capacity is degraded. The resultant problem is that the resistance increases and the capacity retention ratio decreases with the increasing usage period of the cell. Meanwhile, for example, where a design is used such that suppresses the increase in resistance, the initial characteristic (for example, initial resistance) can decrease. In other words, it is difficult to ensure both the initial characteristic and the durability of the cell.

The present invention has been created with consideration for the above-described issues, and it is an objective of the present invention to provide a method for manufacturing a nonaqueous electrolyte secondary cell which can maintain and exhibit excellent cell characteristics over a long period of time. Another related objective is to provide a cell assembly for constructing the cell.

The inventors have considered the issue of forming a low-resistance durable SEI film on the surface of a negative electrode. The comprehensive investigation of this issue resulted in the creation of the present invention.

The present invention provides a method for manufacturing a nonaqueous electrolyte secondary cell. This manufacturing method includes: a step of preparing a negative electrode including a negative electrode mix layer including a carbon material as a negative electrode active material and a positive electrode including a positive electrode mix layer. Included also is a step of housing the positive electrode, the negative electrode, and a nonaqueous electrolytic solution in a cell case. The nonaqueous electrolytic solution includes a Compound (I) represented by the following Formula (I).

[Chem. Formula 1]

(I)

Further, when the BET specific surface area of the negative electrode mix layer is denoted by X ($m^2/g$) and the amount of Compound (I) added to the entire amount of the nonaqueous electrolytic solution is denoted by Y (% by mass), the following relationships are satisfied: $3 \leq X \leq 4.3$; $0.4 \leq Y \leq 1.5$; $(Y/X) \leq 0.35$.

As a result of the above-mentioned features, the full extent of the effect of adding Compound (I) can be demonstrated. In other words, during the initial charging treatment, a good SEI film including a component derived from Compound (I) is properly formed on the surface of a negative electrode. As a result, a low-resistant highly durable SEI film is realized and the interface of the negative electrode and nonaqueous electrolytic solution is greatly stabilized. Therefore, it is possible to manufacture a nonaqueous electrolyte secondary cell which has a better initial cell characteristic and in which the increase in resistance and the decrease in capacity retention ratio are reduced even in long-term continuous use.

Another aspect of the technique disclosed herein resides in a cell assembly before the initial charging which serves for constructing a nonaqueous electrolyte secondary cell. The cell assembly includes a negative electrode having a negative electrode mix layer including a carbon material as a negative electrode active material, a positive electrode including a positive electrode mix layer, a nonaqueous electrolytic solution, and a cell case that houses the positive electrode, the negative electrode, and the nonaqueous electrolytic solution. The nonaqueous electrolytic solution includes Compound (I) represented by Formula (I). Further, when the BET specific surface area of the negative electrode mix layer is denoted by X ($m^2/g$) and the amount of Compound (I) added to the entire amount (100% by mass) of the nonaqueous electrolytic solution is denoted by Y (% by mass), the following relationships are satisfied: $3 \leq X \leq 4.3$; $0.4 \leq Y \leq 1.5$; $(Y/X) \leq 0.35$.

With the cell assembly of such a configuration, it is possible to realize advantageously a nonaqueous electrolyte secondary cell in which the initial resistance is reduced and an excellent cell characteristic (for example, input/output density or energy density) can be maintained and demonstrated over a long period of time.

DESCRIPTION OF THE PREFERRED EMBODIMENTS

The embodiment of the present invention will be explained hereinbelow in greater detail with reference to the appended drawings. The dimensional relationships (length, width, height, etc.) In the drawings do not reflect actual dimensional relationships. It should be noted that matters necessary for carrying out the present invention (for example, general features relating to the configuration and manufacturing method of an electrode body including a positive electrode and a negative electrode, configuration and manufacturing method of a separator, shape of the cell (case), and structure of the cell) other than those specifically referred to in the description are understood to be matters of design for a person skilled in the art which are based on the related art in the pertinent field. The present invention can be implemented on the basis of the contents disclosed in the present specification and the common technical knowledge in the pertinent field.

<<Method for Manufacturing a Nonaqueous Electrolyte Secondary Cell>>

Figure 1:
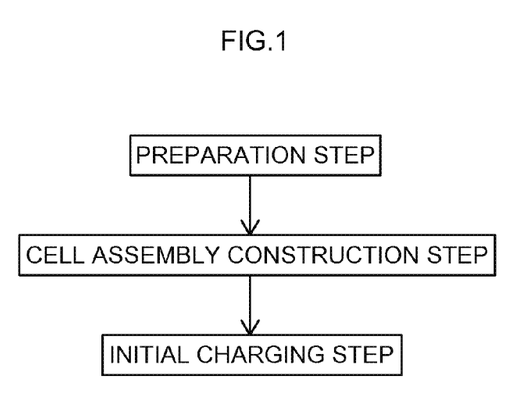
FIG. 1 illustrates the manufacturing flow of a nonaqueous electrolyte secondary cell according to an embodiment.

As depicted in FIG. 1, the method for manufacturing a nonaqueous electrolyte secondary cell disclosed herein includes: (i) a preparation step; (ii) a cell assembly construction step; and (iii) an initial charging step. Here, (i) and (ii) can be also understood as a method for manufacturing a cell assembly. The steps will be explained hereinbelow in the order of description. Described hereinbelow is the case in which a lithium ion secondary cell is manufactured, but this description is not intended to restrict the application object of the present invention.

<<i. Preparation Step>>

Prepared in the preparation step are a negative electrode having a negative electrode mix layer including a carbon material as a negative electrode active material and a positive electrode having a positive electrode mix layer.

<Positive Electrode>

The positive electrode has a configuration in which a positive electrode mix layer including a positive electrode active material is held on a positive electrode collector. An electrically conductive member constituted by a metal with good electric conductivity is advantageously used, in the same manner as in the related art, as the positive electrode collector constituting the positive electrode. For example, aluminum can be used as the electrically conductive member. The thickness of the positive electrode collector can be, for example, 5 μm to 30 μm.

The positive electrode mix layer includes a positive electrode active material. Various materials known to be suitable as positive electrode active materials for lithium ion secondary cells can be used, without any particular limitation, as the positive electrode active material. The preferred examples of the positive electrode active material are lithium transition metal compounds including lithium and at least one transition metal element. Among them, the preferred positive electrode active materials are lithium transition metal composite oxides including Li and at least one of Ni, Co, and Mn.

Where the total content of the transition metal contained in the positive electrode active material is taken as 100 mol %, the ratio of Mn can be 10 mol % or higher (for example, 30 mol % or higher). Mn tends to elute comparatively easily under a high-temperature environment. Therefore, when a positive electrode active material including Mn at the above-mentioned ratio is used, it is preferred that the technique disclosed herein be used. In other words, the effect of increasing durability (high-temperature storage characteristic) can be demonstrated more advantageously in a cell using the positive electrode active material including Mn at the above-mentioned ratio.

The form of the positive electrode active material is not particularly limited. Typically, it is in the granular or powdered form. The average particle size of the granular positive electrode active material usually can be 1 μm to 20 μm (for example, 2 μm to 10 μm). The "average particle size", as referred to in the present specification, is a particle size ($D_{50}$, median size) corresponding to cumulative 50% from the small particle size side in the granulometric distribution, on a volume standard, which is based on a laser diffraction light scattering method.

In addition to the positive electrode active material, the positive electrode mix layer can include, as necessary, an additive such as an electrically conductive and a binding material (binder). An electrically conductive powdered material such as carbon powder or carbon fibers can be advantageously used as the electrically conductive material. Various types of carbon black, for example, acetylene black, is preferred as the carbon powder.

Various polymer materials can be used as the binding materials. For example, when a positive electrode mix layer is formed using an aqueous composition (a composition in which the dispersion medium is water or a mixed solvent including water as the main component), a water-soluble or water-dispersible polymer material can be used. Examples of the water-soluble or water-dispersible polymer materials include cellulose polymers such as carboxymethyl cellulose (CMC); fluororesins such as polytetrafluoroethylene (PTFE); and rubbers such as styrene butadiene rubber (SBR). Alternatively, where the positive electrode mix layer is formed using a solvent-based composition (composition in which the dispersion medium is mainly an organic solvent), polymer materials such as halogenated vinyl resins such as polyvinylidene fluoride (PVdF), and polyalkylene oxides such as polyethylene oxide (PEO) can be used. Such binding materials can be used individually or in combinations of two or more thereof. The polymer materials listed hereinabove by way of example can be used not only as the binding materials, but also as thickening materials, dispersants, and other additives.

The ratio of the positive electrode active material in the entire positive electrode mix layer is greater than about 50% by mass, preferably about 70% by mass to 97% by mass (for example, 75% by mass to 95% by mass). The ratio of the electrically conductive material in the entire positive electrode mix layer is about 2% by mass to 20% by mass (for example, 3% by mass to 10% by mass). The ratio of the binding material in the entire positive electrode mix layer is preferably about 0.5% by mass to 10% by mass (for example, 1% by mass to 5% by mass).

A method for fabricating the positive electrode is not particularly limited, and the conventional method can be used as appropriate. For example, the following method can be used. Initially, the positive electrode active material is mixed together with the electrically conductive material and binding material in an appropriate solvent to prepare a slurry-like composition for forming the positive electrode mix layer. The mixing operation can be performed using, for example, an appropriate kneader (planetary mixer, or the like). Aqueous solvents and organic solvents can be used as the solvent. For example, N-methyl-2-pyrrolidone (NMP) can be used. The prepared composition is then applied to a positive electrode collector, and the solvent contained in the composition is removed. The composition applied to the positive electrode collector can be compressed, as necessary, to obtain the desired thickness and applied amount. As a result, a positive electrode is obtained in which the positive electrode mix layer is formed on the positive electrode collector. An appropriate coating device, for example, a die coater, may be used for applying the composition to the positive electrode collector. A typical drying means (drying by heating or vacuum drying) may be used to remove the solvent.

The applied amount per unit surface area of the positive electrode mix layer on the positive electrode collector (the coated amount (calculated as solids) of the composition for forming the positive electrode mix layer) is not particularly limited. From the standpoint of obtaining a high energy density in combination with a high input/output density, it is preferred that this amount be 3 mg/cm$^2$ or more (for example, 10 mg/cm$^2$ or more, typically 20 mg/cm$^2$ or more) and 100 mg/cm$^2$ or less (for example, 70 mg/cm$^2$ or less, typically 50 mg/cm$^2$ or less) per one side of the positive electrode collector.

<Negative Electrode>

The negative electrode has a configuration in which a negative electrode mix layer including a negative electrode active material is held on a negative electrode collector. An electrically conductive member constituted by a metal with good electric conductivity is advantageously used, in the same manner as in the related art, as the negative electrode collector constituting the negative electrode. For example, copper can be used as the electrically conductive member. The thickness of the negative electrode collector can be, for example, 5 μm to 30 μm.

The negative electrode mix layer includes a carbon material as the positive electrode active material. Typical examples of carbon materials include graphite carbon (graphite) and amorphous carbon. Among them, a carbon material including graphite as the main component (graphite-based carbon material) is preferred. The graphite can be obtained by spheroidization of flaky graphite. Amorphous carbon can be coated on the graphite surface. Carbon materials have lower volume variations (expansion-contraction) during charging and discharging and better durability, for example, than oxides such as lithium titanate or compounds such as silicon materials. Therefore, when the negative electrode active material is a carbon material, the effect of improving the durability can be demonstrated at a higher level. In particular, graphite excels in the orientation of a hexagonal network structure (degree of graphitization). Therefore, it has a high energy density even among the carbon materials. Therefore, when the negative electrode active material is graphite, the initial characteristic (for example, energy density) and durability can be realized at a higher level. Meanwhile, as a trade-off for the high orientation thereof, graphite tends to induce easily side reactions other than charging and discharging. In other words, a nonaqueous electrolytic solution tends to be reduced and decomposed easily on the surface of the negative electrode active material. Therefore, the application of the present configuration demonstrates a particularly strong effect when the negative electrode active material is graphite.

The form of the positive electrode active material is not particularly limited. Typically, it is in the granular or powdered form. The BET specific surface area of the granular negative electrode active material is usually 1 m$^2$/g or more (typically, 2.5 m$^2$/g or more, for example, 2.8 m$^2$/g or more) and 10 m$^2$/g or less (typically 3.5 m$^2$/g or less, for example, 3.4 m$^2$/g or less). The "BET specific surface area of the active material" in the present specification is a value obtained by analyzing with the BET method (for example, the BET 1 point method) the surface area of the active material powder which has been measured by a nitrogen adsorption method.

In addition to the negative electrode active material, the negative electrode mix layer can include, as necessary, an additive such as a binding material. Various polymer materials can be used as the binding material. For example, the binder that can be included in the positive electrode mix layer can be advantageously used with aqueous compositions or solvent-based compositions. Such binding materials can be used not only as the binding materials, but also as thickening materials, dispersants, and other additives.

The ratio of the negative electrode active material in the entire negative electrode mix layer is above about 50% by mass, preferably about 90% by mass to 99% by mass (for example, 95% by mass to 99% by mass, typically 97% by mass to 99% by mass). The ratio of the binding material in the entire negative electrode mix layer is preferably about 1% by mass to 10% by mass (for example, 1% by mass to 5% by mass, typically 1% by mass to 3% by mass).

In the technique disclosed herein, the BET specific surface area of the negative electrode mix layer is 3 m$^2$/g to 4.3 m$^2$/g (for example, 3.2 m$^2$/g to 4.2 m$^2$/g, for example, 3.5 m$^2$/g to 4 m$^2$/g). By setting the BET specific surface area to or above a predetermined value, it is possible to ensure an adequate reaction field with charge carriers (lithium ions in the case of a lithium ion secondary cell) and reduce sufficiently the initial resistance. As a result, a high input/output characteristic can be realized. By setting the BET specific surface area to or below a predetermined value, it is possible to suppress the reduction and decomposition of the nonaqueous electrolytic solution at the negative electrode and suppress the irreversible increase in capacity. As a result, a high capacity retention ratio can be realized. Further, with the technique disclosed herein, the surface of the negative electrode mix layer is covered with a SEI film of appropriate amount and quality. As a result, the abovementioned excellent cell characteristic can be stably maintained and demonstrated over a long period of time. The BET specific surface area of the negative electrode mix layer can be adjusted, for example, on the basis of the BET specific surface area of the negative electrode active material.

The BET specific surface area of the negative electrode mix layer is determined in the following manner. Thus, initially, an appropriate amount of the negative electrode is cut out. When the lithium ion secondary cell is disassembled and the negative electrode is taken out, the cut-out negative electrode is immersed in a nonaqueous solvent such as ethylmethyl carbonate. The negative electrode mix layer is then sampled from the negative electrode with a spatula or the like, and used as a sample. The sample is preparatory dried (degassing conditions) for 1 h at 110° C. by using a specific surface area measuring device (for example "SAP2010" manufactured by Shimadzu Corporation), and the specific surface area is then measured by a nitrogen adsorption method (nitrogen gas is used as the adsorbed medium). The obtained specific surface area is analyzed by the BET method (for example, the BET 1 point method), and the BET specific surface area (m²/g) is calculated. The same method is used in the below-described example.

A method for fabricating the negative electrode is not particularly limited, and the conventional method can be used as appropriate. For example, the following method can be used. Initially, a negative electrode active material is mixed together with a binding material in the appropriate solvent to prepare a slurry-like composition for forming a negative electrode mix layer. An aqueous solvent or an organic solvent can be used as the solvent. For example, water can be used. The prepared composition is applied to a negative electrode collector, the solvent contained in the composition is removed, and the composition is compressed (pressed) if necessary. As a result, a negative electrode is obtained in which the negative electrode mix layer is formed on the negative electrode collector. The operations during the fabrication of the negative electrode (mixing and application of the composition, removal of the solvent, etc.) can be performed in the same manner as in the above-described fabrication of the positive electrode.

The applied amount per unit surface area of the negative electrode mix layer on the negative electrode collector (the coated amount (calculated as solids) of the composition for forming the negative electrode mix layer) is not particularly limited. From the standpoint of obtaining a high energy density together with a high input/output density, it is preferred that this amount be 2 mg/cm² or more (for example, 5 mg/cm² or more, typically 10 mg/cm² or more) and 50 mg/cm² or less (for example, 30 mg/cm² or less, typically 20 mg/cm² or less) per one side of the positive electrode collector.

<<ii. Cell Assembly Construction Step>>

In the cell assembly construction step, the positive electrode and the negative electrode are housed together with the nonaqueous electrolytic solution in the cell case to construct a cell assembly. The cell assembly, as referred to herein, is a cell assembled in the cell manufacturing process up to a state before the initial charging step is performed. A metal material such as aluminum and a resin material such as polyphenylene sulfide can be used for the cell case. The cell case shape is not particularly limited and can be a rectangular parallelepiped or cylindrical shape.

<Nonaqueous Electrolytic Solution>

The nonaqueous electrolytic solution housed in the cell case of the cell assembly is a liquid at normal temperature (for example, 25° C.). In the preferred embodiment, the nonaqueous electrolytic solution is a liquid at all times under the cell usage environment (for example, under a temperature environment from −20° C. to +60° C.). Such a nonaqueous electrolytic solution includes a nonaqueous solvent, a support salt, and lithium tris(oxalate)phosphate.

Various materials which are known to be suitable as support salts (lithium salts) for nonaqueous electrolytic solutions of lithium ion secondary cells can be used without any particular limitations. The preferred examples of the support salts include $LiPF_6$, $LiBF_4$, $LiAsF_6$, $LiCF_3SO_3$, $LiC_4F_9SO_3$, $Li(CF_3SO_2)_2N$, and $LiC(CF_3SO_2)_3$, $LiSiF_6$, and $LiClO_4$. Those compounds can be used individually or in combinations of two or more thereof. Among them, $LiPF_6$ and $LiBF_4$ are preferred. The concentration of the support salt in the nonaqueous electrolytic solution housed in the cell case is preferably within a range of about 0.1 mol/L to 5 mol/L (for example, 0.5 mol/L to 3 mol/L, typically 0.8 mol/L to 2.0 mol/L). From the standpoint of demonstrating a better effect produced as a result of using lithium tris(oxalate)phosphate, it is preferred that the concentration of the support salt be 1 mol/L or more (for example, 1 mol/L to 5 mol/L), more preferably 1.05 mol/L or more (for example, 1.05 mol/L to 3 mol/L), even more preferably 1.1 mol/L or more (for example, 1.1 mol/L to 2 mol/L).

Various organic solvents such as carbonates, ethers, esters, nitriles, sulfones, and lactones, which can be used in a nonaqueous electrolytic solution of a typical lithium ion secondary cell, can be used as the nonaqueous solvent. Specific examples thereof include ethylene carbonate (EC), propylene carbonate (PC), diethyl carbonate (DEC), dimethyl carbonate (DMC), ethylmethyl carbonate (EMC), vinylene carbonate, 1,2-dimethoxyethane, 1,2-diethoxyethane, tetrahydrofuran, 2-methyltetrahydrofuran, dioxolane, 1,3-dioxolane, diethylene glycol dimethyl ether, ethylene glycol dimethyl ether, acetonitrile, propionitrile, nitromethane, N,N-dimethylformamide, dimethylsulfoxide, sulfolane, γ-butyrolactone, and fluorine compounds thereof (for example, fluorinated carbonates such as monofluoroethylene carbonate and difluoroethylene carbonate). Those compounds can be used individually or in combinations of two or more thereof.

Carbonate-based solvents are the preferred examples of the nonaqueous solvents. The carbonate-based solvent, as referred to herein, is a nonaqueous solvent in which the total volume of carbonates takes 60% by volume or more (preferably 75% by volume or more, more preferably 90% by volume or more, and may be substantially 100% by volume) of the entire volume of the nonaqueous solvent. With the configuration including the carbonate-based solvent and lithium tris(oxalato)phosphate, a SEI film with a further reduced resistance is formed on the negative electrode surface. Therefore, the effect of the present configuration can be advantageously demonstrated to a greater extent.

From the standpoint of electric conductivity and electrochemical stability, a combined system of a cyclic carbonate and a chain carbonate is preferred as the carbonate. For example, it is preferred that the mixing ratio of a cyclic carbonate and a chain carbonate be within a range of 20:80 to 40:60 (based on the volume standard). EC and PC are preferred as the cyclic carbonates, and EC among them is particularly preferred. DEC, DMC, and EMC are preferred as the chain carbonate and DMC and EMC among them are particularly preferred. When DMC and/or EMC is used as the chain carbonate, the mixing ratio of DMC and EMC is 0:100 to 100:0, preferably 20:80 to 80:20 (for example, 40:60 to 70:30, typically 50:50 to 65:35), based on the volume standard.

<Lithium Tris(Oxalate)Phosphate>

The nonaqueous electrolytic solution housed in the cell assembly is characterized by including lithium tris(oxalate) phosphate (can be also referred to hereinbelow as Compound (I) represented by the following Formula (I).

[Chem. Formula 2]

During the below-described initial charging, Compound (I) is drawn to the negative electrode and incorporated in the SEI film on the negative electrode surface. Further, Compound (I) is chemically or electrically decomposed on the negative electrode surface, and the decomposition products can adhere to (be adsorbed by or bonded to) the negative electrode surface. Thus, a high-quality SEI film including a component derived from Compound (I) is formed on the negative electrode surface. Such a SEI film can be of a low resistance and high durability.

Thus, in the structure of Compound (I), three oxalates ($C_2O_4$) are bonded to one phosphorus atom (P). The component derived from Compound (I) can strongly adhere to (be adsorbed by or bonded to) the electrode surface through such a structure. As a result, by contrast with the case in which the conventional additive, for example, having no such structure is used, a highly durable SEI film can be formed on the electrode surface. In other words, the SEI film on the electrode surface can be maintained stably over a long period of time. Further, Compound (I) does not include a halogen, such as a fluorine atom, that can be associated with the increase in resistance of the SEI film. Therefore, the increase in the resistance of the SEI film after the long-term use can be suppressed as compared, for example, with the case in which the additive such as disclosed in Japanese Patent Application Publication No. 2011-187440 is used. Therefore, with the technique disclosed herein, excellent long-term durability (for example, a high capacity retention ratio or low resistance) can be realized even when a cell is used, without replacement, over a long period of time, for example, 10 years or more. This is apparently because the increase in resistance is suppressed, for example, by electron attraction and structural stability based on the structure of Compound (I), although the mechanism of such suppression is not clear.

In the technique disclosed herein, the amount of Compound (I) added is determined according to the properties (for example, BET specific surface area) of the negative electrode mix layer. In other words, when the BET specific surface area of the negative electrode mix layer is 3 $m^2/g$ to 4.3 $m^2/g$, where the total amount of the nonaqueous electrolytic solution housed in the cell assembly is taken as 100% by mass, the ratio (amount added) of Compound (I) is 0.4% by mass or more (for example, 0.7% by mass or more, for example, 0.8% by mass or more). By setting the amount added to be equal to or higher than a predetermined value, it is possible to include a sufficient amount of the component derived from Compound (I) into the SEI film on the negative electrode surface. As a result, a sufficient effect of adding Compound (I) can be demonstrated. For example, the increase in resistance during high-temperature storage can be suppressed to a higher degree and durability can be advantageously increased.

The upper limit value of the ratio (amount added) of Compound (I) is also determined, for example, with consideration for the solubility in the nonaqueous solvent and properties (for example, BET specific surface area) of the negative electrode mix layer. In other words, when the BET specific surface area of the negative electrode mix layer is 3 $m^2/g$ to 4.3 $m^2/g$, where the total amount of the nonaqueous electrolytic solution housed in the cell assembly is taken as 100% by mass, the ratio (amount added) of Compound (I) is 1.5% by mass or less (for example, 1.3% by mass or less, for example, less than 1% by mass). By setting the amount added to be equal to or less than a predetermined value, it is possible to suppress greatly the increase in resistance caused by excess addition of Compound (I). Further, it is possible to realize a uniform nonaqueous electrolytic solution in which undesirable effects such as precipitation are unlikely to occur.

Further, with the technique disclosed herein, where the BET specific surface area per unit mass of the negative electrode mix layer is denoted by X ($m^2/g$) and the amount of Compound (I) added to the entire amount of the nonaqueous electrolytic solution is denoted by Y (% by mass), the following relationship is satisfied: (Y/X)≤0.35. In other words, the amount of Compound (I) added per BET specific surface area of the negative electrode mix layer is set to or less than a predetermined value. The excess formation of the coating film on the surface of the negative electrode mix layer and the participation of the residue of Compound (I) in side reactions are thus suppressed. As a result, the increase in resistance caused by excess addition of Compound (I) is suppressed. For example, (Y/X)≤0.3, typically (Y/X)≤0.25, and the relationship (Y/X)≤0.15 is also possible.

In the preferred embodiment disclosed herein, the X and Y fulfill the following relationship: Y≤0.6154X-1.1462. As a result, both the durability (for example, suppression of increase in resistance during high-temperature storage) and other cell characteristics (capacity retention ratio, initial resistance) can be improved at a higher level.

In another preferred embodiment, the X and Y fulfill the following relationship: Y≥0.6923X-1.6769. As a result, the effect of the present configuration can be demonstrated at a higher level.

The nonaqueous electrolytic solution housed in the cell assembly may include, as necessary, optional additives, provided that the effect of the present invention is not lost. The additives can be used with one, or two or more objectives such as the improvement of the input/output characteristic of the cells, the improvement of storage characteristic, the improvement of cycle characteristic, and the increase in the initial charge-discharge efficiency. Examples of the preferred additives include the so-called film-forming agents such as fluorophosphates (preferably, difluorophosphates, for example, lithium difluorophosphate represented by $LiPO_2F_2$) or lithium bisoxalatoborate (LiBOB). Further, an additive such as cyclohexylbenzene and biphenyl, which can be used to suppress overcharging, may be also used. It is preferred that such a nonaqueous electrolytic solution does not include alkali metal ions other than $Li^+$.

<iii. Initial Charging Step>

In the initial charging step, the cell assembly is initially charged. Typically, an external power source is connected between the positive electrode (positive electrode terminal) and negative electrode (negative electrode terminal) of the cell assembly and charging to a predetermined voltage range (typically, constant-current charging) is performed. As a result, a high-quality SEI film including a component derived from Compound (I) is formed on the negative electrode surface.

The voltage of the initial charging may be set, for example, such that at least one of the nonaqueous solvents is electrically decomposed. For example, when the negative electrode active material is a carbon material and the nonaqueous solvent is a carbonate-based solvent, the voltage between the positive electrode and negative electrode terminals may be about 3.5 V or higher, for example, 4 V to 4.2 V. Such charging may be performed by a method for constant-current charging till the cell voltage reaches a predetermined value from the start of charging (CC charging) or by a method of constant-voltage charging after the predetermined voltage has been reached (CC-CV charging). The charging rate during the constant-current charging is usually 1 C or less, preferably 0.1 C to 0.2 C. According to the findings of the inventors, where charging is performed at a low rate of 1 C or less, part of the nonaqueous electrolytic solution (for example, the nonaqueous solvent or Compound (I)) is relatively gently decomposed. The SEI film including the components of the nonaqueous electrolytic solution is then formed with an advantageous compactness (for example, with a low resistance and such that the reactivity with the nonaqueous electrolytic solution can be sufficiently suppressed) on the negative electrode surface. Therefore, the effect of the present configuration can be demonstrated at a higher level. The charging can be performed in a single cycle, or in two or more cycles with discharging cycles being interposed therebetween.

In the preferred embodiment, after the charging treatment, the cell assembly is held for a predetermined period of time (aged) under a high-temperature environment with a temperature of 40° C. or higher (for example, 40° C. to 60° C.). For example, a temperature-controlled thermostat or IR heater can be used as a means for heating and holding the cell assembly. The state of charge of the cell during such high-temperature holding is usually SOC 70% or higher (preferably SOC 80% or higher, for example, SOC 80% to 100%, more preferably SOC 90% or higher). Further, the time (aging time) for holding the cell assembly at a high temperature depends, for example, on the holding temperature, state of charge, or configuration of the nonaqueous electrolytic solution and is not particularly limited. In an advantageous example, the total time from the start of charging is about 10 h to 48 h (for example, about 24 h). According to the findings of the inventors, where a cell is stored for a predetermined period of time at a high SOC and a high temperature, the growth of the SEI film formed on the negative electrode surface during the charging is enhanced. As a result, the effect of adding Compound (I) is demonstrated better than in the case in which, for example, the cell is stored at a low SOC and/or at a temperature equal to or lower than the room temperature, and better than in a cell which has not been subjected to aging. Therefore, the abovementioned effect of reducing the resistance and the effect of increasing the durability can be realized at a higher level.

The presence/absence of the components derived from Compound (I) can be confirmed, for example, in the following manner. For example, when the nonaqueous electrolytic solution is evaluated, a hole is opened in the upper surface of the cell case, and the nonaqueous electrolytic solution is sampled therethrough to obtain a measurement sample. For example, when the SEI film on the negative electrode surface is evaluated, the negative electrode is sampled and immersed for a predetermined time into an appropriate solvent (for example, a 50% acetonitrile aqueous solution). As a result, the coating film components (for example, $Li^+$ and a group including a P atom such as $PO_4^{3-}$) are extracted into the solvent which is used as the measurement sample. The measurement samples are then measured with the conventional and well-known IC (Ion Chromatography), GC-MS (Gas Chromatography-Mass Spectrometry), LC-MS (Liquid Chromatography-Mass Spectrometry), XAFS (X-ray Absorption Fine Structure), and ICP-AES (Inductively Coupled Plasma-Atomic Emission Spectrometry). Such measurements enable qualitative and quantitative determination of the film components. The measurement method can be selected, as appropriate, for example, according to the type of the elements which are the object of measurement.

The nonaqueous electrolyte secondary cell disclosed herein can thus be manufactured.

The technique disclosed herein provides a nonaqueous electrolyte secondary cell equipped with a positive electrode including a positive electrode active material, a negative electrode including a carbon material as a negative electrode active material, and a cell case housing the positive electrode and the negative electrode. In such a nonaqueous electrolyte secondary cell, a nonaqueous electrolytic solution is housed inside the cell case. A high-quality SEI including a component derived from Compound (I) is formed at least on the surface of the negative electrode. A good balance of the initial characteristics and durability of the cell is thereby achieved. The resultant remarkable effects include excellent initial cell characteristics and small increase in resistance and decrease in capacity retention ratio even in long-term continuous use.

A nonaqueous electrolyte secondary cell in which a flatly wound electrode body (wound electrode body) and a nonaqueous electrolytic solution are housed in a case of a flat rectangular parallelepiped shape (cell case) is explained as an example of a schematic configuration of the nonaqueous electrolyte secondary cell obtained by the manufacturing method of the present embodiment, but the present invention is not intended to be limited to such an embodiment.

Figure 2:
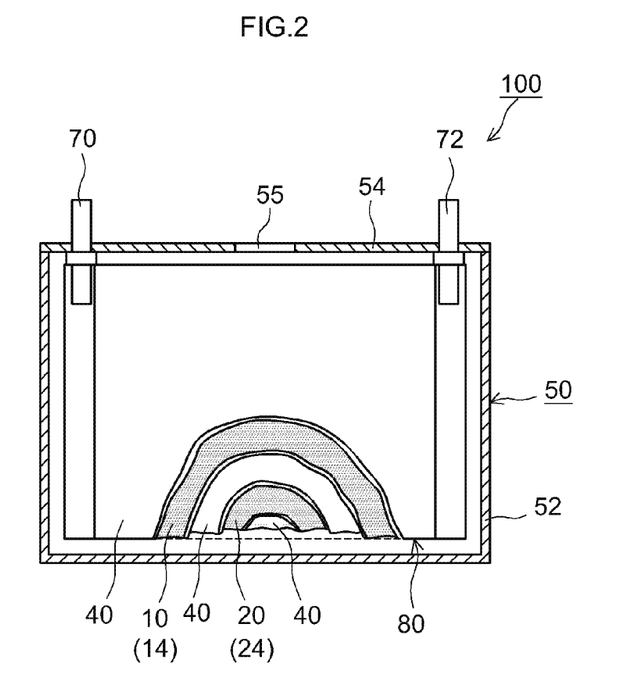
FIG. 2 is a schematic cross-sectional view of the nonaqueous electrolyte secondary cell according to the embodiment.

FIG. 2 is a vertical sectional view illustrating schematically the cross-sectional structure of a nonaqueous electrolyte secondary cell 100. The nonaqueous electrolyte secondary cell 100 has a configuration in which an electrode body (wound electrode body) 80 obtained by flatly winding an elongated positive electrode sheet 10 and an elongated negative electrode sheet 20, with an elongated separator sheet 40 being interposed therebetween, is housed together with a nonaqueous electrolytic solution (not depicted in the figure) in a cell case 50 of a flat box-like shape.

The cell case 50 is provided with a cell case main body 52 of a flat rectangular parallelepiped shape (box-like shape) opened at one end and a lid 54 closing the opening. A positive electrode terminal 70 for external connection which is electrically connected to the positive electrode of the wound electrode body 80 and a negative electrode terminal 72 which is electrically connected to the negative electrode of the wound electrode body 80 are provided to the upper surface (that is the lid 54) of the cell case 50. A safety valve 55 for releasing the gas generated inside the cell case 50 to the outside of the case 50 is provided, in the same manner as in the cell case of the conventional nonaqueous electrolyte secondary cell, to the lid 54.

At a stage preceding the assembling, the wound electrode body 80 is provided with the positive electrode (positive electrode sheet) 10 in the form of a long sheet and the negative electrode (negative electrode sheet) 20 in the form of a long sheet. The positive electrode sheet 10 includes an elongated positive electrode collector and a positive electrode mix layer 14 formed along the longitudinal direction on at least one surface (typically both surfaces) of the collector. The negative electrode sheet 20 includes an elongated negative electrode collector and a negative electrode mix layer 24 formed along the longitudinal direction on at least one surface (typically both surfaces) of the collector. An insulating layer preventing direct contact between the positive electrode mix layer 14 and the negative electrode mix layer 24 is disposed therebetween. Two separators 40 in the form of elongated sheets are used as the insulator layers. Such a wound electrode body 80 can be fabricated, for example, by laminating the positive electrode sheet 10, separator sheet 40, negative electrode sheet 20, and separator sheet 40 in the order of description, winding the resultant laminate in the longitudinal direction, and compressing and collapsing the obtained wound body from the side surface direction to form a flattened shape.

In the central portion in the width direction, which is specified as a direction from one end to the other end in the winding axis direction of the wound electrode body 80, a wound core portion is formed in which the positive electrode mix layer 14 formed on the surface of the positive electrode collector and the negative electrode mix layer 24 formed on the surface of the negative electrode collector are overlapped and tightly laminated. At both ends, in the winding axis direction, of the wound electrode body 80, a positive electrode mix layer non-formation portion of the positive electrode sheet 10 and a negative electrode mix layer non-formation portion of the negative electrode sheet 20 protrude outward from the wound core portion. A positive electrode lead terminal is provided to the protruding portion on the positive electrode side, a negative electrode lead terminal is provided to the protruding portion on the negative electrode side, and the positive electrode terminal 70 and the negative electrode terminal 72 are electrically connected to the respective lead terminals.

The nonaqueous electrolyte secondary cell disclosed herein can be used for a variety of applications, and in such applications, a low initial resistance and good cell characteristics can be maintained as a result of adding Compound (I) to the nonaqueous electrolytic solution. Therefore, in the nonaqueous electrolyte secondary cell disclosed herein, good input/output characteristic can be maintained over a long period of time and excellent durability can be also realized. Such nonaqueous electrolyte secondary cell can be advantageously used a power source (drive power source) for a motor installed on a vehicle such as a hybrid vehicle (HV), plug-in vehicle (PHV), and electric vehicle (EV). Therefore, such a configuration makes it possible to provide a vehicle carrying any of the nonaqueous electrolyte secondary cells disclosed herein (also in the form of a cell pack in which a plurality of cells is connected).

Several examples relating to the present invention are explained hereinbelow, but the present invention is not intended to be limited to those examples.

[Fabrication of Positive Electrode]

A slurry-like composition for forming a positive electrode mix layer was prepared by mixing $LiNi_{1/3}Co_{1/3}Mn_{1/3}O_2$ as a positive electrode active material, acetylene black (AB) as an electrically conductive materials, and polyvinylidene fluoride (PVdF) as a binding material by using N-methyl-2-pyrrolidone (NMP) such as to obtain the mass ratios of those materials of 90:8:2. The composition was coated on both surfaces of an aluminum foil (thickness 15 μm) to obtain a coated amount per one surface of 30 mg/cm² (based on solids). The coating was then dried and pressed to fabricate a positive electrode sheet in which the positive electrode mix layer was provided on both surfaces of the positive electrode collector.

[Fabrication of Negative Electrode]

A slurry-like composition for forming a negative electrode mix layer was prepared by mixing a natural graphite powder as a negative electrode active material, styrene-butadiene rubber (SBR) as a binding material, and carboxymethyl cellulose (CMC) as a dispersion material by using ion-exchange water such as to obtain the mass ratios of those materials of 98:1:1. The composition was coated on both surfaces of a copper foil (thickness 10 μm) to obtain a coated amount per one surface of 15 mg/cm². The coating was then dried and pressed to fabricate a negative electrode sheet in which the negative electrode mix layer was provided on both surfaces of the negative electrode collector. The BET specific surface area X (m²/g) of the negative electrode mix layer relating to each example was adjusted by using the negative electrode active materials with different BET specific surface areas such as to obtain the values shown in Table 1.

[Fabrication of Lithium Ion Secondary Cell]

A wound electrode body was fabricated by winding the positive electrode sheet and negative electrode sheet fabricated in the above-described manner together with two separator sheets. A three-layer PP/PE/PP structure obtained by laminating polypropylene (PP) layers on both surfaces of a polyethylene (PE) layer was used as the separator sheet. Electrode terminals were joined to the respective ends of the positive and negative electrode collectors of the wound electrode body, and the resultant configuration was housed in an aluminum cell case. A cylindrical cell assembly of an 18650 type was then constructed by pouring a nonaqueous electrolytic solution and sealing.

The nonaqueous electrolytic solution was prepared by mixing ethylene carbonate (EC), dimethyl carbonate (DMC), and ethylmethyl carbonate (EMC) at volume ratios of EC: DMC:EMC=30:40:30 to obtain a mixed solvent, dissolving $LiPF_6$ as a support salt in the mixed solvent to a concentration of 1.1 mol/L, and then adding lithium tris (oxalate)phosphate (Compound (I)) represented by Formula (1) above in an added amount Y (% by mass) indicated in Table 1.

Figure 3:
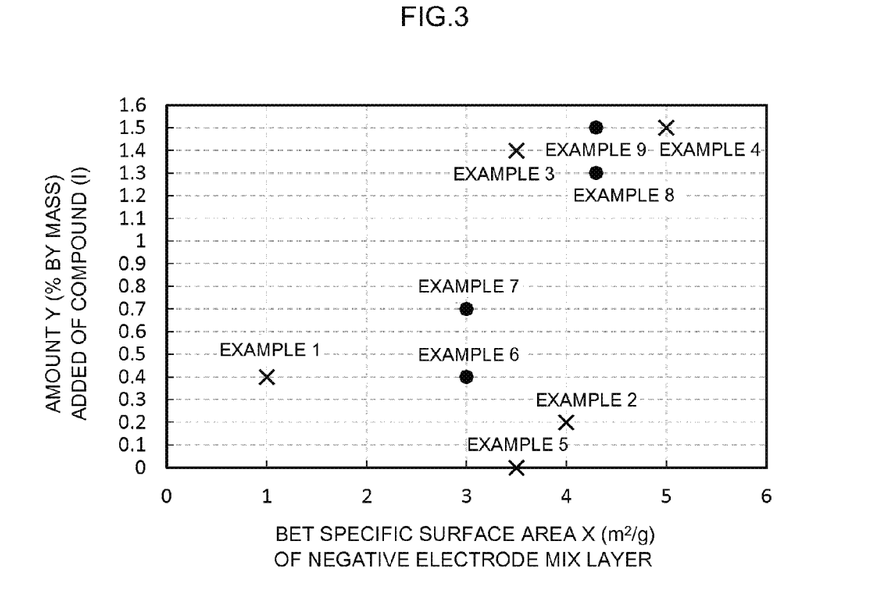
FIG. 3 is a graph representing the relationship between the BET specific surface area of the negative electrode mix layer and the amount added of Compound (I).

FIG. 3 shows the BET specific surface area of the negative electrode mix layer and the amount added of Compound (I) in the test examples.

The constructed cell assembly was CC charged at a 0.1 C constant current till the terminal voltage between the positive and negative electrodes reached 4.1 V (initial charging step).

The cell assembly after the initial charging was adjusted to SOC 90%, then placed in a temperature-controlled thermostat and the temperature thereof was raised to 40° C. The cell was then held (aged) at a high temperature of 40° C. till 24 h elapsed since the start of temperature rise, while maintaining the SOC 90% state.

Lithium ion secondary cells relating to various examples were thus fabricated.

[Measurement of Initial Capacity]

The initial capacity was measured according to the following procedures 1 to 3 at a temperature of 25° C. with respect to the lithium ion secondary cells after the above-described pretreatment.

(Procedure 1) After a voltage of 3.0 V is reached in ⅓C constant-current discharging, the cell is constant-voltage discharged for 2 h, and then allowed to stay for 10 min.

(Procedure 2) After a voltage of 4.1 V is reached in ⅓C constant-current discharging, the cell is constant-voltage discharged to a current of 1/100C, and then allowed to stay for 10 min.

(Procedure 3) After a voltage of 3.0 V is reached in ⅓ C constant-current discharging, the cell is constant-voltage discharged to a current of 1/100 C, and then allowed to stay for 10 min.

The discharge capacity (CCCV discharge capacity) in Procedure 3 was taken as the initial capacity.

[Measurement of Initial Resistance (IV Resistance)]

The SOC of the lithium ion secondary cells relating to each example was adjusted to 60% at a temperature of 25° C. The cells adjusted to SOC 60% were CC discharged for 10 sec at a 10 C rate, and the drop in voltage over this period was measured. A IV resistance (mΩ) was calculated by dividing the measured voltage drop amount by the current value during the CC discharging, and the calculated value was taken as the initial resistance. The results are shown in Table 1.

[High-Temperature Storage Test]

The SOC of the lithium ion secondary cells relating to each example was adjusted to 85% at a temperature of 25° C. The cells adjusted to SOC 85% were stored for 30 days in a thermostat at a temperature of 60° C. After the test has been completed, the cells were removed from the thermostat, and the cell capacity and IV resistance were measured at a temperature of 25° C. In the same manner as in the case of initial resistance. The capacity retention ratio (%) and resistance increase ratio (%) were calculated by dividing measured values obtained after the high-temperature storage test by the initial values. The results are shown in Table 1.

amount of the coating film formed per unit specific surface area of the negative electrode mix layer can become large (thick coating film). Alternatively, the residue of Compound (I) participates in side reactions and the quality of the SEI film can be degraded. As a result, the effect of the present configuration can be reduced.

By contrast, in Examples 6 to 9, the initial resistance was suppressed, excellent capacity retention ratio after the high-temperature storage was obtained, and the increase in resistance after the high-temperature storage was also suppressed. With the cells used for the tests, as a result of adding Compound (I) to the nonaqueous electrolytic solution and setting the BET specific surface area X of the negative electrode mix, the amount Y added of Compound (I), and the ratio (Y/X) thereof within the predetermined ranges, the resistance increase ratio during the high-temperature storage was reduced to a very low value of 103% or less.

TABLE 1

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Amount Y added of Compound (I) (% by mass) | 0.4 | 0.2 | 1.4 | 1.5 | 0 | 0.4 | 0.7 | 1.3 | 1.5 |
| BET specific surface area X($m^2$/g) of negative electrode mix layer | 1 | 4 | 3.5 | 5 | 3.5 | 3 | 3 | 4.3 | 4.3 |
| Y/X | 0.40 | 0.05 | 0.40 | 0.30 | 0.00 | 0.13 | 0.23 | 0.30 | 0.35 |
| Resistance increase ratio (%) | 105 | 124 | 135 | 105 | 130 | 103 | 102 | 102 | 101 |
| Capacity retention ratio (%) | 93 | 94 | 92 | 85 | 92 | 93 | 94 | 92 | 92 |
| Initial resistance (mΩ) | 101 | 94 | 96 | 96 | 93 | 80 | 82 | 79 | 81 |

As indicated in Table 1 and FIG. 3, in Example 2 and Example 5 in which the amount added of Compound (I) was less than 0.4% by mass, a significant increase in resistance was observed after high-temperature storage. In other words, where the absolute amount of the added Compound (I) related to the BET specific surface area of the negative electrode mix layer is too small, the effect of the present configuration can decrease. Meanwhile, in the presently used nonaqueous electrolytic solution, the solubility limit was reached when the amount of Compound (I) added exceeded 1.5% by mass. In other words, a more homogeneous nonaqueous electrolytic solution can be maintained by setting the amount of Compound (I) added to the solubility or therebelow.

Further, in Example 1 in which the BET specific surface area of the negative electrode mix layer was 1 $m^2$/g, the initial resistance was larger than in other examples. In other words, when the BET specific surface area of the negative electrode mix layer is too small, the initial resistance tends to increase. Meanwhile, in Example 4 in which the BET specific surface area of the negative electrode mix layer was 5 $m^2$/g, the capacity retention ratio after the high-temperature storage decreased. In other words, when the BET specific surface area of the negative electrode mix layer is too large, the capacity retention ratio tends to degrade.

Further, in Example 3 in which the ratio (Y/X) of the amount Y of Compound (I) related to the BET specific surface area X of the negative electrode mix layer exceeded 0.35, the resistance increase ratio after the high-temperature storage was high. In other words, where the amount of Compound (I) added is too large with respect to the BET specific surface area of the negative electrode mix layer, the

The above-mentioned results indicate that the addition of Compound (I) to the nonaqueous electrolytic solution suppress the increase in resistance during the high-temperature storage. Further, as a result of setting the BET specific surface area X of the negative electrode mix, the amount Y added of Compound (I), and the ratio (Y/X) thereof within the predetermined ranges, the initial resistance is sufficiently suppressed and excellent durability (maintenance of the capacity retention ratio and suppression of resistance increase) is realized. Because of such results, it is possible to realize a (highly durable) nonaqueous electrolyte secondary cell in which good cell characteristics (for example, input/output characteristic) can be maintained over a long period of time.

The specific examples of the present invention are described hereinabove in detail, but those examples place no limitation on the claims. Thus, the techniques set forth in the claims are inclusive of various changes and modifications of the above-described specific examples.

What is claimed is:

1. A method for manufacturing a nonaqueous electrolyte secondary cell,
  the method comprising:
    a step of preparing a negative electrode having a negative electrode mix layer including a carbon material as a negative electrode active material, and a positive electrode having a positive electrode mix layer;
    a step of housing the positive electrode and the negative electrode together with a nonaqueous electrolytic solution in a cell case and constructing a cell assembly; and
    an initial charging step of performing initial charging processing on the cell assembly, wherein the nonaqueous electrolytic solution includes a Compound (I) represented by the following Formula (I):

(I)

and a BET specific surface area X (m²/g) of the negative electrode mix layer and an amount Y (% by mass) of the Compound (I) added to the entire amount of the nonaqueous electrolytic solution satisfy the following relationships:

$3 \leq X \leq 4.3$;

$0.4 \leq Y \leq 1.5$; and $0.13 \leq (Y/X) \leq 0.35$.

2. A cell assembly before initial charging for constructing a nonaqueous electrolyte secondary cell,
the cell assembly comprising:
a negative electrode having a negative electrode mix layer including a carbon material as a negative electrode active material;
a positive electrode having a positive electrode mix layer;
a nonaqueous electrolytic solution; and
a cell case in which the positive electrode, the negative electrode, and the nonaqueous electrolytic solution are housed, wherein
the nonaqueous electrolytic solution includes a Compound (I) represented by the following Formula (I):

(I)

and a BET specific surface area X (m²/g) of the negative electrode mix layer and an amount Y (% by mass) of the Compound (I) added to the entire amount of the nonaqueous electrolytic solution satisfy the following relationships:

$3 \leq X \leq 4.3$;

$0.4 \leq Y \leq 1.5$; and $0.13 \leq (Y/X) \leq 0.35$.

* * * * *